(12) United States Patent
Nainar et al.

(10) Patent No.: US 11,343,152 B2
(45) Date of Patent: May 24, 2022

(54) TRAFFIC MANAGEMENT FOR SMART NETWORK INTERFACE CARDS

(71) Applicant: Cisco Technology, Inc., San Jose, CA (US)

(72) Inventors: Nagendra Kumar Nainar, Morrisville, NC (US); Carlos M. Pignataro, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 108 days.

(21) Appl. No.: 16/842,457

(22) Filed: Apr. 7, 2020

(65) Prior Publication Data

US 2021/0314232 A1  Oct. 7, 2021

(51) Int. Cl.

| | |
|---|---|
| *H04W 36/30* | (2009.01) |
| *H04L 41/12* | (2022.01) |
| *H04L 41/0893* | (2022.01) |
| *H04L 45/02* | (2022.01) |
| *H04L 45/42* | (2022.01) |
| *H04L 45/64* | (2022.01) |
| *H04L 47/125* | (2022.01) |

(52) U.S. Cl.
CPC .......... *H04L 41/12* (2013.01); *H04L 41/0893* (2013.01); *H04L 45/02* (2013.01); *H04L 45/42* (2013.01); *H04L 45/64* (2013.01); *H04L 47/125* (2013.01)

(58) Field of Classification Search
CPC ..... H04L 41/12; H04L 45/42; H04L 41/0893; H04L 47/125; H04L 45/02; H04L 45/64
See application file for complete search history.

(56) References Cited

U.S. PATENT DOCUMENTS

| | | | |
|---|---|---|---|
| 2016/0094667 A1 | 3/2016 | Jani | |
| 2016/0232019 A1* | 8/2016 | Shah | ................... G06F 9/45558 |
| 2018/0109471 A1* | 4/2018 | Chang | ................... H04L 49/253 |

(Continued)

OTHER PUBLICATIONS

International Search Report and Written Opinion from the International Searching Authority, dated Jun. 7, 2021, 13 pages, for corresponding International Patent Application No. PCT/US2021/022298.

(Continued)

*Primary Examiner* — Walli Z Butt
(74) *Attorney, Agent, or Firm* — Polsinelli PC

(57) ABSTRACT

Systems, methods, and computer-readable for load distribution amongst smart network interface cards (sNICs) connected to a host device include a controller. The controller can instantiate an agent in the host device to obtain telemetry information pertaining to the sNICs, where the sNICs can be used for communication between the host device and upstream devices in a software-defined network. The telemetry information indicates service offloading capabilities of the sNICs. The controller can also obtain network topology information pertaining to at least the host device, the sNICs and the upstream devices, and determine load distribution policies for the sNICs based on the network topology information and the telemetry information. The controller can provide the load distribution policies to the one or more upstream devices, where the load distribution policies take into account the service offload capabilities of the sNICs.

20 Claims, 12 Drawing Sheets

(56) References Cited

U.S. PATENT DOCUMENTS

2020/0112903 A1* 4/2020 Wolcott .............. H04W 36/385
2020/0167205 A1* 5/2020 Guim Bernat ........ H04L 9/0637
2020/0210370 A1* 7/2020 Powley ............... G06F 15/8046

OTHER PUBLICATIONS

Durner, Raphael, et al., "HNLB: Utilizing Hardware Matching Capabilities of NICs for Offloading Stateful Load Balancers," 2019 IEEE, 7 pages.

Mohammadkhan, Ali, et al., "P4NFV: P4 Enabled NFV Systems with SmartNICs," 2019 IEEE Conference on Network Function Virtualization and Software Defined Networks (NFV-SDN), Nov. 12, 2019, pp. 1-7.

Le, Yanfang, et al., "UNO: Unifying Host and Smart NIC Offload for Flexible Packet Processing," Proceedings of the 2017 Symposium on Cloud Computing, SOCC 17, Sep. 27, 2017, pp. 506-519.

* cited by examiner

TRAFFIC MANAGEMENT FOR SMART NETWORK INTERFACE CARDS

TECHNICAL FIELD

The subject matter of this disclosure relates in general to the field of computer networking, and more particularly to managing traffic distribution in networks utilizing smart network interface cards (sNICs).

BACKGROUND

The enterprise network landscape is continuously evolving. There is a greater demand for mobile and Internet of Things (IoT) device traffic, Software as a Service (SaaS) applications, and cloud adoption. In recent years, software-defined enterprise network solutions have been developed to address the needs of enterprise networks. Software-defined enterprise networking is part of a broader technology of software-defined networking (SDN) that includes both software-defined wide area networks (SDWAN) and software-defined local area networks (SDLAN). SDN is a centralized approach to network management which can abstract away the underlying network infrastructure from its applications. This de-coupling of data plane forwarding and control plane can allow a network operator to centralize the intelligence of the network and provide for more network automation, operations simplification, and centralized provisioning, monitoring, and troubleshooting.

Network interface controllers or network interface cards (NICs) can provide network interfaces to host devices (e.g., data centers, virtual networks, etc.) on the SDNs, for example. Some NICs can be configured to provide additional functionality such as performance acceleration, virtualization, and other processing. The term smart NIC (sNIC) can refer to NICs having enhanced intelligence to support the additional functionality. For example, the sNICs, can be implemented as application specific integrated circuits (ASICs), field-programmable gate arrays, (FPGAs), systems on chip (SoCs), or other implementations to provide control plane functions such as virtualization and programming capabilities. Some sNICs can include hypervisors to instantiate virtual machines or vector packet processing (VPP) operations. Performing the network functions in the sNICs is also referred to as offloading the network functions to the sNICs. Examples of functions which can be offloaded to the sNICs include cloud native services, managing state entries for data flows, accelerating packet forwarding and treatment, etc.

In some examples, one or more upstream devices can be connected to a host using one or more sNICs. While the upstream devices, such as switches or routers can distribute traffic amongst the available sNICs which can service a host, the existing technology does not offer visibility regarding offloaded traffic to these upstream devices. For example, the traffic which can be offloaded can differ between the different sNICs which are available. Thus, even though the traffic directed to the sNICs may have been efficiently distributed by the upstream devices, the distribution may be skewed based on the differing amounts of the traffic which is offloaded in the individual sNICs. Such imbalances can cause ineffective utilization of the sNICs and lead to errors, packet losses, failures, and other undesirable effects, potentially leading to severe disruptions in intent based networking.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
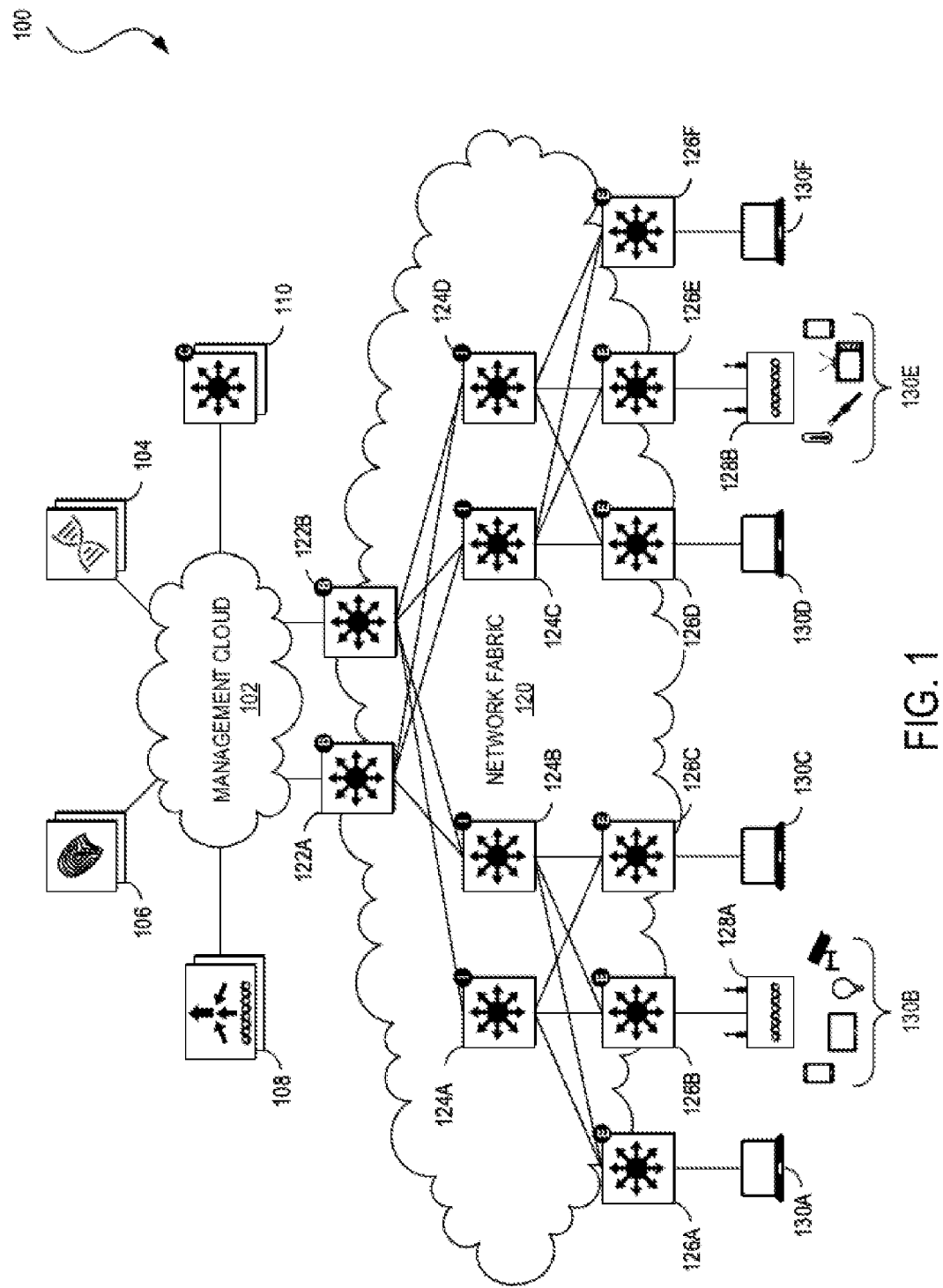
FIG. 1 illustrates a topology of an enterprise network in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

OVERVIEW

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed herein are systems, methods, and computer-readable media for load distribution amongst smart network interface cards (sNICs) connected to a host device include a controller. The controller can instantiate an agent in the host device to obtain telemetry information pertaining to the sNICs, where the sNICs can be used for communication between the host device and upstream devices in a software-defined network. The telemetry information indicates service offloading capabilities of the sNICs. The controller can also obtain network topology information pertaining to at least the host device, the sNICs and the upstream devices, and determine load distribution policies for the sNICs based on the network topology information and the telemetry information. The controller can provide the load distribution policies to the one or more upstream devices, where the load distribution policies take into account the service offload capabilities of the sNICs.

In some examples, a method is provided. The method includes obtaining telemetry information pertaining to one or more smart network interface cards (sNICs) configured for communication between a host device and one or more upstream devices in a software-defined network, the telemetry information indicating at least service offloading capabilities of the one or more sNICs; obtaining network topology information pertaining to at least the host device, the one or more sNICs and the one or more upstream devices; determining load distribution policies for the one or more sNICs based on the network topology information and the telemetry information; and providing the load distribution policies to the one or more upstream devices.

In some examples, a system is provided. The system, comprises one or more processors; and a non-transitory computer-readable storage medium containing instructions which, when executed on the one or more processors, cause the one or more processors to perform operations including: obtaining telemetry information pertaining to one or more smart network interface cards (sNICs) configured for communication between a host device and one or more upstream devices in a software-defined network, the telemetry information indicating at least service offloading capabilities of the one or more sNICs; obtaining network topology information pertaining to at least the host device, the one or more sNICs and the one or more upstream devices; determining load distribution policies for the one or more sNICs based on the network topology information and the telemetry information; and providing the load distribution policies to the one or more upstream devices.

In some examples, a non-transitory machine-readable storage medium is provided, including instructions configured to cause a data processing apparatus to perform operations including: obtaining telemetry information pertaining to one or more smart network interface cards (sNICs) configured for communication between a host device and one or more upstream devices in a software-defined network, the telemetry information indicating at least service offloading capabilities of the one or more sNICs; obtaining network topology information pertaining to at least the host device, the one or more sNICs and the one or more upstream devices; determining load distribution policies for the one or more sNICs based on the network topology information and the telemetry information; and providing the load distribution policies to the one or more upstream devices.

In some examples, obtaining the telemetry information comprises instantiating an agent in the host device to gather the telemetry information and receiving the telemetry information based on the telemetry information being published by the agent.

Some examples further comprise receiving one or more segment identifiers (SIDs) associated with the one or more sNICs and providing the load distribution policies to the one or more upstream devices using the one or more SIDs.

In some examples, the load distribution policies comprise granular policies for forwarding traffic over one or more links connecting the one or more upstream devices to the one or more sNICs, the granular policies comprising indications of strict forwarding over the one or more links or load balancing over a combination of two or more of the one or more links.

In some examples, providing the load distribution policies to the one or more upstream devices comprises providing one or more weights associated with one or more links connecting the one or more upstream devices to the one or more sNICs, wherein load distribution over the one or more links is based on respective one or more weights associated with the one or more links.

In some examples, the load distribution policies to the one or more upstream devices further comprises an indication for forwarding traffic over a link to at least network interface card (NIC) not configured for service offloading.

Some examples further comprise determining load distribution policies for two or more sNICs connected to two or more upstream devices based on a combination of persistent data and real-time data, the persistent data comprising one or more of the network topology information, tenant information in the host, and service offloading capability information for the two or more sNICs, and the real-time data comprising traffic load of the two or more sNICs.

DESCRIPTION OF EXAMPLE EMBODIMENTS

Disclosed herein are systems, methods, and computer-readable media for managing traffic distribution amongst one or more smart Network Interface Cards (sNICs). In examples where two or more sNICs, possibly in combination with traditional NICs (i.e., without built-in intelligence for enabling offloads), are configured for providing a network interface to a host (e.g., a virtual network or data center) for data traffic received from one or more upstream devices, a topology of the network fabric along with telemetry information is conveyed to a controller or other device. For example, the telemetry information can be captured by an agent on the host, where the telemetry information includes the real-time offload capabilities of each of the two or more sNICs. The agent can signal the telemetry information to the controller using one-hop signaling or using other signaling techniques. The controller, which can be a centralized SDN controller can analyze the telemetry using the topology as a backdrop to determine whether the sNICs are being used efficiently. The controller can determine whether any load rebalancing among the sNICs, in view of their differing offload capabilities can improve their utilization. The controller can convey to the upstream devices such load rebalancing guidance, based on which the upstream devices can make appropriate adjustments to the traffic directed to the sNICs. These and other aspects will be explained in further detail with reference to the figures below.

FIG. 1 illustrates an example of a physical topology of an enterprise network 100 which may be configured according to aspects of this disclosure. In one example, the enterprise network 100 may provide intent-based networking. It should be understood that, for the enterprise network 100 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the enterprise network 100 can include any number or type of resources, which can be accessed and utilized by endpoints or network devices. The illustrations and examples provided herein are for clarity and simplicity.

In this example, the enterprise network 100 includes a management cloud 102 and a network fabric 120. Although shown as an external network or cloud to the network fabric 120 in this example, the management cloud 102 may alternatively or additionally reside on the premises of an organization or in a colocation center (in addition to being hosted by a cloud provider or similar environment). The management cloud 102 can provide a central management plane for building and operating the network fabric 120. The management cloud 102 can be responsible for forwarding configuration and policy distribution, as well as device management and analytics. The management cloud 102 can comprise one or more network controller appliances 104, one or more authentication, authorization, and accounting (AAA) appliances 106, one or more wireless local area network controllers (WLCs) 108, and one or more fabric control plane nodes 110. In other embodiments, one or more elements of the management cloud 102 may be co-located with the network fabric 120.

The network controller appliance(s) 104 can function as the command and control system for one or more network fabrics, and can house automated workflows for deploying and managing the network fabric(s). The network controller appliance(s) 104 can include automation, design, policy, provisioning, and assurance capabilities, among others, as discussed further below with respect to FIG. 2. In some embodiments, one or more Cisco Digital Network Architecture (Cisco DNA™) appliances or other SDN controllers can operate as the network controller appliance(s) 104.

The AAA appliance(s) 106 can control access to computing resources, facilitate enforcement of network policies, audit usage, and provide information necessary to bill for services. The AAA appliance can interact with the network controller appliance(s) 104 and with databases and directories containing information for users, devices, things, policies, billing, and similar information to provide authentication, authorization, and accounting services. In some embodiments, the AAA appliance(s) 106 can utilize Remote Authentication Dial-In User Service (RADIUS) or Diameter to communicate with devices and applications. In some embodiments, one or more Cisco® Identity Services Engine (ISE) appliances can operate as the AAA appliance(s) 106.

The WLC(s) 108 can support fabric-enabled access points attached to the network fabric 120, handling traditional tasks associated with a WLC as well as interactions with the fabric control plane for wireless endpoint registration and roaming. In some embodiments, the network fabric 120 can implement a wireless deployment that moves data-plane termination (e.g., Virtual Extensible Local Area Network or "VXLAN") from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some embodiments, one or more Cisco® Wireless Controllers, Cisco® Wireless LAN, and/or other Cisco DNA™-ready wireless controllers can operate as the WLC(s) 108.

The network fabric 120 can comprise fabric border nodes 122A and 122B (collectively, 122), fabric intermediate nodes 124A-D (collectively, 124), and fabric edge nodes 126A-F (collectively, 126). Although the fabric control plane node(s) 110 are shown to be external to the network fabric 120 in this example, in other embodiments, the fabric control plane node(s) 110 may be co-located with the network fabric 120. In embodiments where the fabric control plane node(s) 110 are co-located with the network fabric 120, the fabric control plane node(s) 110 may comprise a dedicated node or set of nodes or the functionality of the fabric control node(s) 110 may be implemented by the fabric border nodes 122.

The fabric control plane node(s) 110 can serve as a central database for tracking all users, devices, and things as they attach to the network fabric 120, and as they roam around. The fabric control plane node(s) 110 can allow network infrastructure (e.g., switches, routers, WLCs, etc.) to query the database to determine the locations of users, devices, and things attached to the fabric instead of using a flood and learn mechanism. In this manner, the fabric control plane node(s) 110 can operate as a single source of truth about where every endpoint attached to the network fabric 120 is located at any point in time. In addition to tracking specific endpoints (e.g., /32 address for IPv4, /128 address for IPv6, etc.), the fabric control plane node(s) 110 can also track larger summarized routers (e.g., IP/mask). This flexibility can help in summarization across fabric sites and improve overall scalability.

The fabric border nodes 122 can connect the network fabric 120 to traditional Layer 3 networks (e.g., non-fabric networks) or to different fabric sites. The fabric border nodes 122 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 122 can also exchange reachability and policy information with fabric control plane nodes of different fabric sites. The fabric border nodes 122 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 124 can operate as pure Layer 3 forwarders that connect the fabric border nodes 122 to the fabric edge nodes 126 and provide the Layer 3 underlay for fabric overlay traffic. The fabric edge nodes 126 can connect endpoints to the network fabric 120 and can encapsulate/decapsulate and forward traffic from these endpoints to and from the network fabric. The fabric edge nodes 126 may operate at the perimeter of the network fabric 120 and can be the first points for attachment of users, devices, and things and the implementation of policy. In some embodiments, the network fabric 120 can also include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 126 for communication to outside subnets.

In this example, the network fabric can represent a single fabric site deployment which can be differentiated from a multi-site fabric deployment.

The enterprise network 100 can also include wired endpoints 130A, 130C, 130D, and 130F and wireless endpoints 130B and 130E (collectively, 130). The wired endpoints 130A, 130C, 130D, and 130F can connect by wire to fabric edge nodes 126A, 126C, 126D, and 126F, respectively, and the wireless endpoints 130B and 130E can connect wirelessly to wireless access points 128B and 128E (collectively, 128), respectively, which in turn can connect by wire to fabric edge nodes 126B and 126E, respectively. In some embodiments, Cisco Aironet® access points, Cisco Meraki® MR access points, and/or other Cisco DNA™-ready access points can operate as the wireless access points 128.

The endpoints 130 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 130 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some embodiments, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 108 notifying the fabric control plane node(s) 110 of joins, roams, and disconnects by the wireless endpoints 130 such that the fabric control plane node(s) can have connectivity information about both wired and wireless endpoints in the network fabric 120, and can serve as the single source of truth for endpoints connected to the network fabric. For data plane integration, the WLC(s) 108 can instruct the fabric wireless access points 128 to form a VXLAN overlay tunnel to their adjacent fabric edge nodes 126. The AP VXLAN tunnel can carry segmentation and policy information to and from the fabric edge nodes 126, allowing connectivity and functionality identical or similar to that of a wired endpoint. When the wireless endpoints 130 join the network fabric 120 via the fabric wireless access points 128, the WLC(s) 108 can onboard the endpoints into the network fabric 120 and inform the fabric control plane node(s) 110 of the endpoints' Media Access Control (MAC) addresses. The WLC(s) 108 can then instruct the fabric wireless access points 128 to form VXLAN overlay tunnels to the adjacent fabric edge nodes 126. Next, the wireless endpoints 130 can obtain IP addresses for themselves via Dynamic Host Configuration Protocol (DHCP). Once that completes, the fabric edge nodes 126 can register the IP addresses of the wireless endpoint 130 to the fabric control plane node(s) 110 to form a mapping between the endpoints' MAC and IP addresses, and traffic to and from the wireless endpoints 130 can begin to flow.

Figures 2A, 2B, 2C:
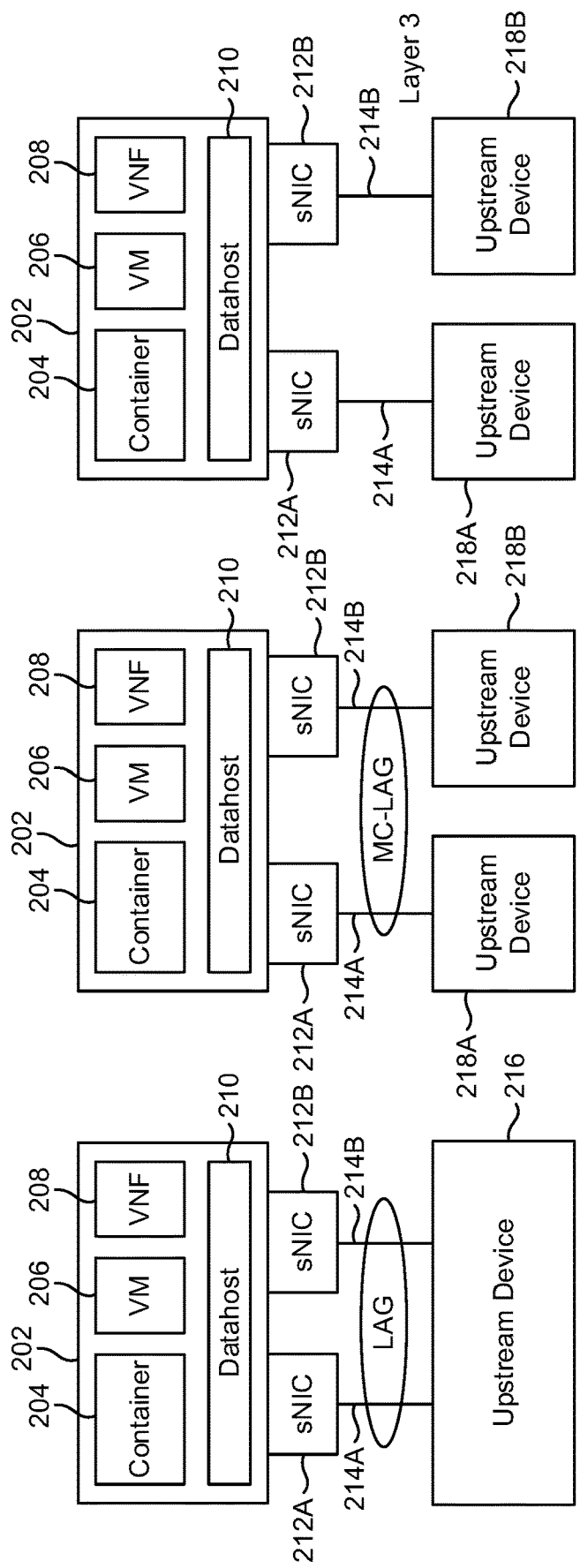
FIGS. 2A-C illustrate traditional deployments of load sharing and routing traffic through two or more sNICs connected to a host device.

FIGS. 2A-C illustrate example aspects of a network 200 utilizing one or more smart NICs or sNICs. For example, a host 202 can include a network device or site (e.g., a data center) connected to a network fabric such as the network fabric 120 of the enterprise network 100 discussed with reference to FIG. 1. The host 202 can include various components, among which a container 204, a virtual machine (VM) 206, a virtual network function (VNF) 208 architecture or network functions virtualization machine, and a data host 210 are shown as illustrative (keeping in mind that the host 202 may have more, less, or different configurations or components without deviating from the scope of this description).

In FIG. 2A, an upstream device 216 is shown to be connected through one or more links of the network to the host 202, using interface devices which include two sNICs 212A-B. The upstream device can include a switch, a router or other fabric device. The two links 214A-B can be configured based on network design choices. For example, the links 214A-B with respective sNICs 212A-B can be aggregated to form a link aggregation group (LAG) in L2 or L3. In FIG. 2B, two upstream devices 218A-B are shown with respective links 214A-B connected to the sNICs 212A-B. In such examples, a multi-chassis LAG or MC-LAG can be formed for the sNICs deployed in the illustrated topology. In FIG. 2C, the upstream devices 218A-B may communicate using independent links 214A-B, respectively, with the sNICs 212A-B in independent (non-aggregated) topologies.

In the various examples shown in FIGS. 2A-C and others, a traditional deployment may utilize conventional load sharing techniques for routing traffic through the sNICs without taking into account their individual offload capabilities. For example, considering the LAG shown in FIG. 2A, there may be 100 different flows that can be forwarded towards the host 202 from the upstream device 216 in an illustrative scenario. Load sharing such as equal-cost multi-path routing (ECMP) techniques may account for flow entropy and implement a load sharing where 50 flows are directed through the link 214A while the remaining 50 flows are routed through the link 214B. While such traditional load sharing techniques can seek to balance the traffic flows efficiently, they do not take into account the service offload capabilities of the sNICs 212A-B. For example, out of the 50 flows routed through the link 214A, 45 flows may be offload eligible at the sNIC 212A, while only 10 flows out of the 50 flows over the link 214B may be offload eligible at the sNIC 212B. In this illustrative scenario, the sNIC 212A may be utilized more heavily than the sNIC 212B as more traffic is offloaded by the sNIC 212A than by the sNIC 212B, leading to traffic imbalance. This imbalance, when scaled over a large number of flows (e.g., hundreds of thousands of flows in typical deployments), one of the sNICs such as the sNIC 212A may be overloaded while the other sNIC 212B may be underutilized for its offloading capability. Although the topologies in FIGS. 2B-C can differ in terms of the number of upstream devices, aggregation of the links, etc., similar problems in load balancing can arise when traffic is forwarded over the links 214A-B without taking into account the offloading capabilities of the sNICs 212A-B.

While the above problem has been explained using load distribution as an example, similar concerns may arise for other attributes of the traffic, such as latency, ports, source and destination addresses, etc. In an intent based networking environment, the offloading capabilities of each sNIC may be based on specific policies and intent, and traditional implementations do not consider these policies when forwarding traffic through the link topologies discussed with reference to FIGS. 2A-C above.

In example aspects of this disclosure, the topology of a network can be made visible to a controller, along with telemetry information which is representative of the offload capabilities of sNICs. The controller (e.g., a centralized SDN controller) can determine load distribution based on the topology and the offload capabilities. Aspects of this disclosure are applicable to any network architecture such as SDNs or intent-based networks deployed using IP/IPv6 environment, SDN controlled environments such as SR/SRv6/BIER, or other.

Figure 3:
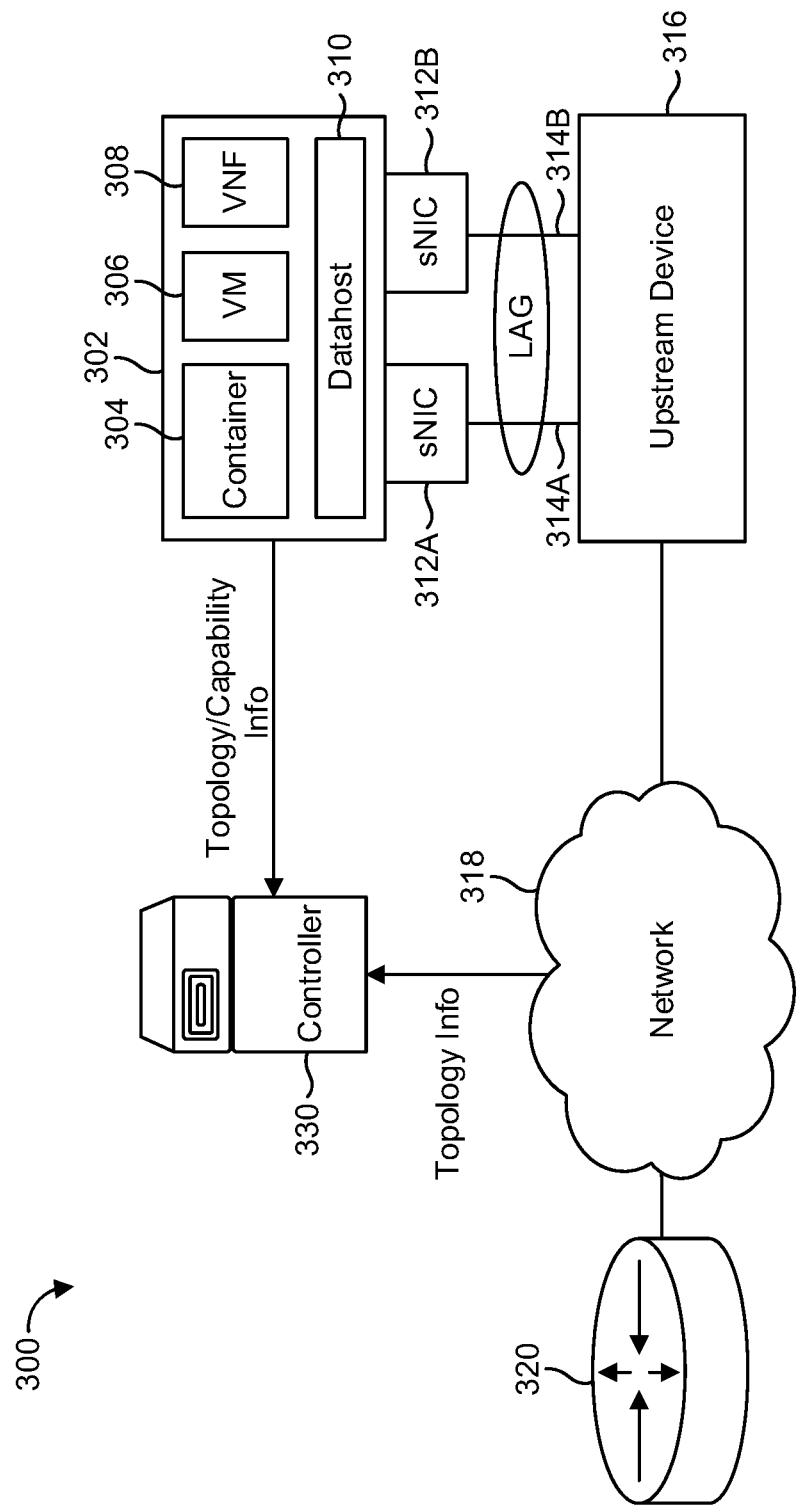
FIG. 3 illustrates aspects of a network configured for load distribution amongst sNICs taking into account service offload capabilities of the sNICs, in accordance with some examples.

FIG. 3 illustrates aspects of an SDN network 300 configured according to example aspects of this disclosure. A host 302 may be similar to the host 202 discussed previously and can include various components such as a container 304, VM 306, VNF 308, and/or data host 310, among others. An upstream device 316 may be a network or fabric device which can direct traffic to the host 302 over one or more links 314A-B. In some examples, the links 314A-B may be aggregated in a LAG. The links 314A-B may interface with the host 302 using sNICs 312A-B, respectively.

The upstream device 316 can connect to a network 318 which may be similar to the network fabric 120. A network device 320 (e.g., a branch site) can communicate with a remote host such as the host 302 through the network 318 assisted by the upstream device 316. A controller 330 can be an SDN controller of the network 300 (e.g., similar to the control plane nodes 110 of FIG. 1).

The topology of the network 318 can be obtained by the controller 330 (e.g., the controller 330 can collect information regarding the various network devices and their upstream/downstream connections) using different types of telemetry information. In example aspects, the network topology obtained by the controller 330 can be augmented with information regarding the capabilities of sNICs in the network, including the offload capabilities of the sNICs. The host 302 can provide topology and capability information of interfaces such as the sNICs 312A-B to the controller 330.

Figure 4:
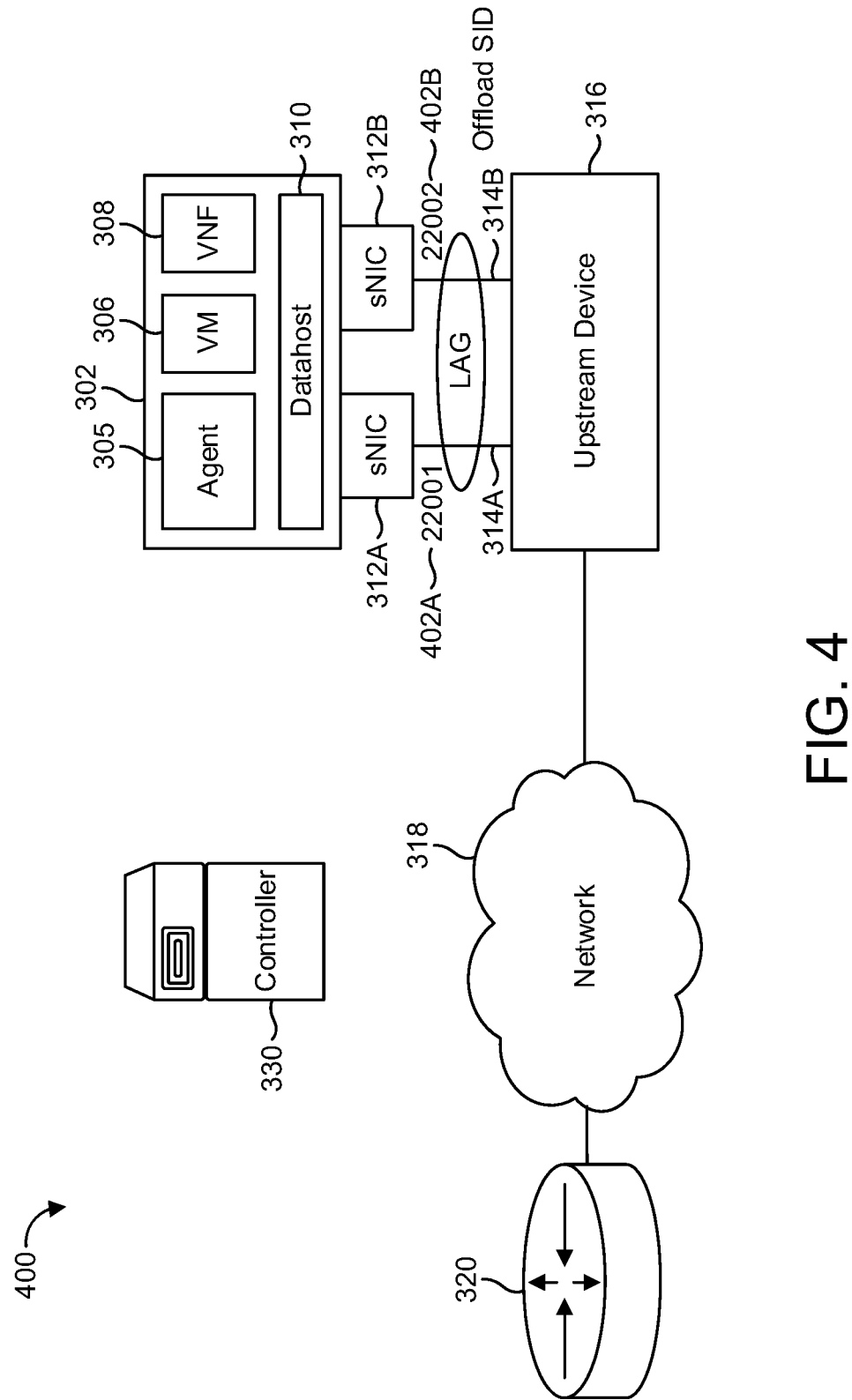
FIG. 4 illustrates aspects of using segment identifiers (SIDs) in determining policies for load distribution amongst sNICs, in accordance with some examples.

FIG. 4 illustrates another view of the network 300 showing aspects of obtaining the telemetry information from the host 302. In some examples, an agent 305 can be provided in the host 302 to gather telemetry information pertaining to the devices connected to the host 302 such as the sNICs 312A-B. The agent 305 can be instantiated by the controller 330 in the host 302 and configured to gather the desired telemetry information. The agent 305 can communicate with a device plugin application programming interface (DPAPI) or similar module provided on the host 302 to obtain the telemetry information. The telemetry information can include offload capability, services that can be offloaded, supported protocols, any pertinent limitations, scale information or other such information related to the sNICs 312A-B.

The controller 330 can leverage the topology information and the telemetry information to procure an end-to-end visibility from the physical layer to the application layer in the network 300, including the above details of the sNICs.

In some examples, the controller 330 can direct, based on the topology, one or more network devices to perform load distribution which takes into account the service offload capabilities of the sNICs 312A-B. In some examples, the controller 330 can designate segment identifiers (SIDs) to the sNICs 312A-B to assist with the load distribution.

In some examples, the host 302 and the upstream device 316 can communicate to negotiate or identify links of the network 300 (e.g., the links 314A-B) to utilize for traffic flow between the host 302 and the upstream device 316. In the process of such communication the host 302 can detect the presence of service offload capable sNICs. Although exhaustive details of such negotiations to detect the sNICs is beyond the scope of this disclosure, extensions to link layer protocols such as Link Layer Discovery Protocol (LLDP) or out of band mechanisms such as YANG can be utilized for detecting service offload capable sNICs 312A-B, for example.

For each sNIC and related link identified using the above techniques, a unique segment ID (also referred to as an offload-SID) can be assigned. For example, the SIDs 402A-B can be assigned to the sNICs 312A-B, respectively, by the upstream device 316. In other examples, the controller 330 can leverage the topology information and visibility into the hardware/performance/other capabilities of the links and assign unique SIDs for each such link to a sNIC. The controller 330 can also program the host 302 and/or the upstream device 316 with these SIDs.

In FIGS. 3-4, the controller 330 can detect the presence of sNICs 312A-B connected to the host 302 to which the upstream device 316 directs traffic. Based on the topology of the network 318 previously obtained by the controller 330, the controller 330 can determine that the upstream device 316 is connected through the two sNICs 312A-B to the host 302. In such examples, the controller 330 can assign the SIDs 402A-B to the sNICs 312A-B, or more specifically, to the links 314A-B. Regardless of the specific process for assigning the SIDs 402A-B, the controller 330 can utilize the SIDs 402A-B to communicate to the upstream device 316, for example, to provide guidance on distributing traffic flows to the sNICs associated with the SIDs 402A-B.

It will be appreciated that the SIDs 402A-B allocated as above for enabling the service offload aware traffic distribution are different from adjacent-SIDs or L2 Adjacent SIDs which may be allocated for unrelated purposes. For example, the SIDs may not be assigned based on adjacency criteria (e.g., to allocate sequential IDs to immediately neighboring sNICs) but the SIDs 402A-B are assigned only to links connected to sNICs on their remote or downstream end. Furthermore, it will be appreciated that the host 302 may not run interior gateway protocol (IGP) or other protocols for exchanging routing information, and as such, the host 302 may be assigned an IP address and use overlay networks such as VxLAN for tenant awareness. The SIDs 402A-B according to example aspects are assigned to hosts that may not run any IGP within the network.

Figure 5B:
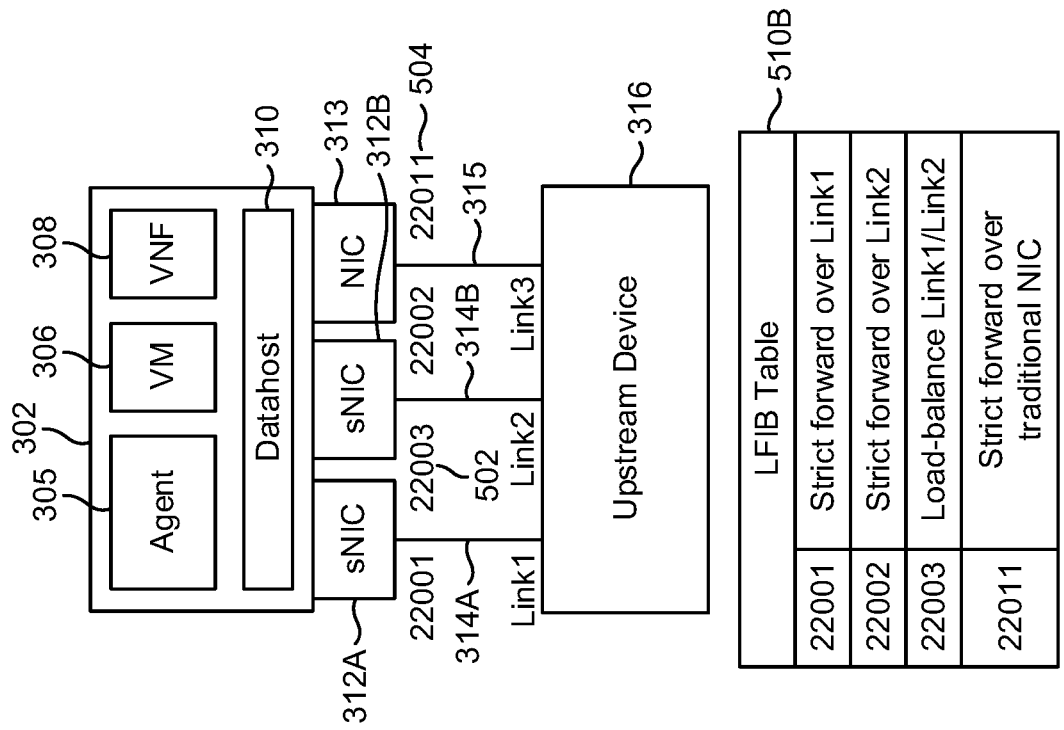
FIGS. 5A-B illustrates aspects of granular load distribution policies amongst sNICs and NICs connected to a host, accordance with some examples.
Figure 5A:
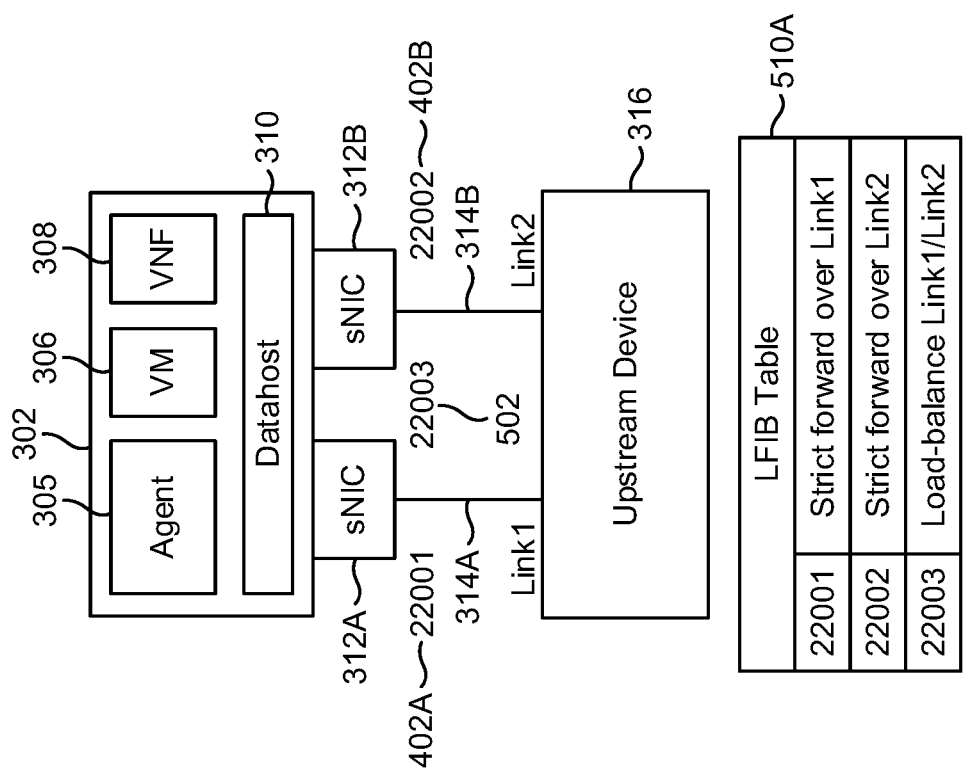

FIGS. 5A-B illustrate aspects of traffic distribution using the SIDs assigned to the links as discussed with reference to FIG. 4. In some examples, a granular approach can be adopted for the traffic distribution to direct traffic to the different sNIC (possibly in conjunction with traditional NICs which can also be present). For example, the traffic directed on links to one or more specific NICs can be controlled in a granular manner, as well as allowing a distributed load directed to a combination of NICs.

FIG. 5A illustrates semantics for granular load distribution amongst the sNICs 312A-B using the Label Forwarding Information Base (LFIB) table 510A. The various entries of the LFIB table 510A indicate how the traffic will be forwarded over the link 314A (Link 1) and the link 314B (Link 2) connected to the sNICs 312A and 312B respectively. If the semantics identify a specific SID, then the traffic can be strictly forwarded over the link associated with the SID. For example, entries 520 and 522 indicate strict forwarding of traffic over the respective Link 1 and Link 2. For example, if the controller 330 determines that the sNIC 312A is the most capable of handling all the traffic directed to the host 302 from the upstream device 316, the controller 330 can direct the upstream device 316 to forward all traffic strictly over the Link 1 (link 314A) towards the sNIC 312A without directing any traffic to other links. Similarly, the controller 330 can direct the upstream device 316 to forward all traffic strictly over the Link 2 (link 314B) towards the sNIC 312B without directing any traffic to other links.

In some examples, another SID 502 can be created which can be associated with multiple sNICs. When such a SID 502 is used, it can indicate load balancing across multiple links. For example, as shown in the entry 524, the SID 502 can indicate load balancing between Link 1 and Link 2, to cause the upstream device to perform load balancing (e.g., using ECMP or other techniques) in a manner which takes into account the service offload capabilities of the sNICs 312A-B. In some examples, the load balancing can be performed using weights associated with the different links, where the traffic on a link can be proportional to or correspond to the weight associated with the link. For example, with normalized weights of 0.3 and 0.7 associated with Link 1 and Link 2, respectively, the upstream device 316 can forward 30% of the load over Link 1 and 70% of the load over Link 2.

FIG. 5B illustrates another NIC 313, which may be a traditional NIC present in addition to the sNICs for interfacing traffic over link 315 with the host 302. The NIC 313 may not have any service offload capabilities. In some examples, a SID 504 can be associated with the traditional NIC 313. The controller 330 can direct forwarding traffic over the link 315 to the traditional NIC 313 by specifying the SID 504. For example, the entry 526 shown in the LFIB table 510B indicates semantics for strict forwarding over the link 315 to the traditional NIC 313, where the other entries 520, 522, and 524 of the LFIB table 510B can be similar to those described with reference to the LFIB table 510A above.

In some examples, the SIDs can be assigned by the sNICs (or for the sNICs by the controller 330), instead of to the links as discussed above. The forwarding semantic can differ from those shown in tables 510A-B when the SIDs are assigned to the sNICs rather than to the links. In such examples, an upstream node connected to a sNIC can use a forward semantic of "SWAP and strict forward" to sNIC, while sNICs can have semantics for "POP and offload the service".

Figure 6:
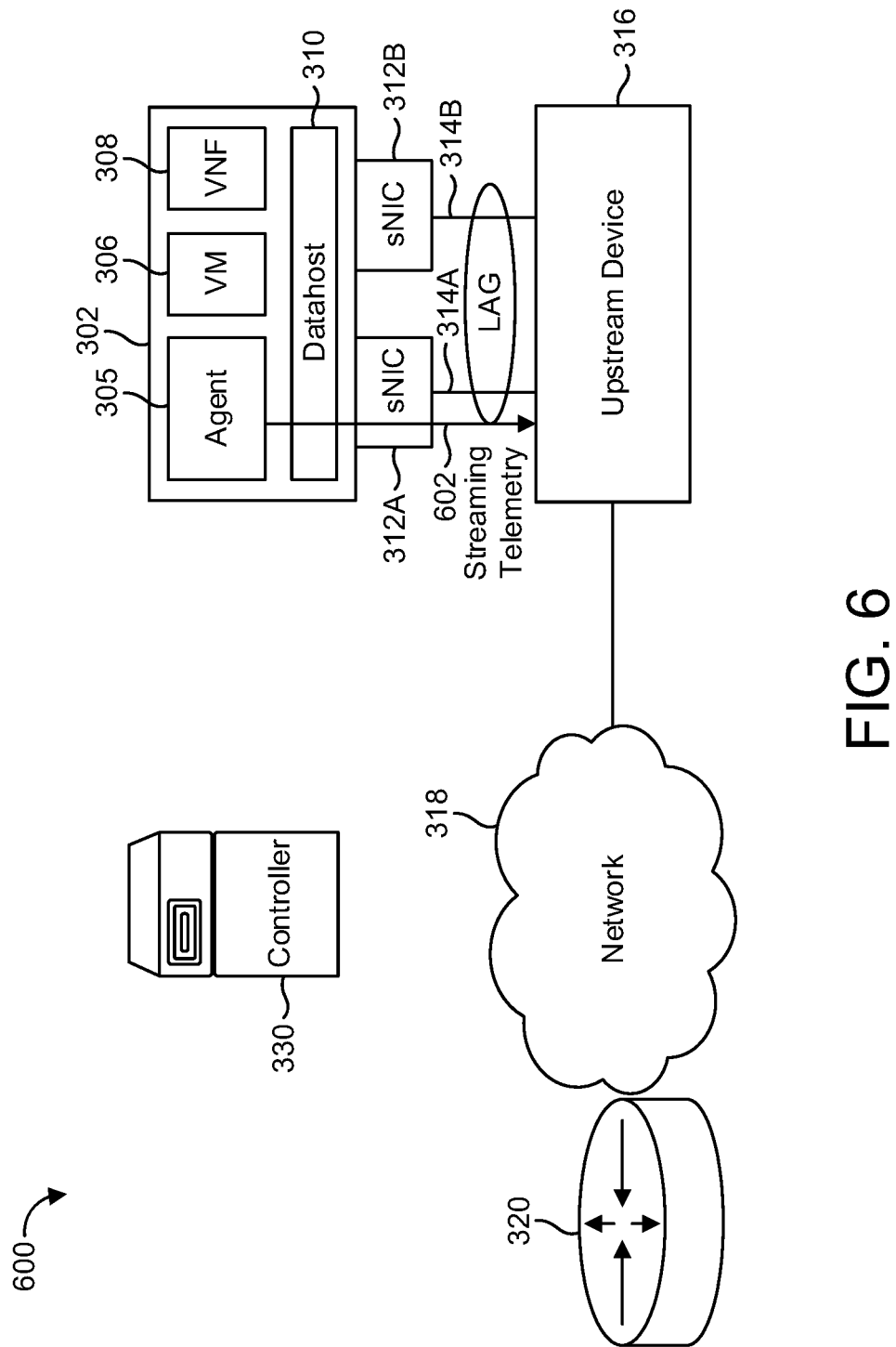
FIG. 6 illustrates aspects of publishing streaming telemetry information related to sNICs connected to a host device, by an agent in the host device, for providing load distribution policies to upstream devices, in accordance with some examples.

FIG. 6 illustrates aspects of real time streaming telemetry based load awareness in the network 300. In some examples, the agent 305 of the host 302 can collect real-time load statistics obtained from the different sNICs 312A-B and form telemetry data. The telemetry data can be published using streaming telemetry 602. The data published using streaming telemetry 602 can be tenant aware, in the sense that the data can be published on a per-tenant basis (e.g., for each sNIC). The upstream device 316 can be the subscriber to the data published, i.e., receive the published data from the streaming telemetry 602. In some examples, an ingress node or the controller 330 can be the subscriber to the data published.

In some examples, the streaming telemetry 602 can be used for offload load aware traffic distribution. In some examples, the upstream device 316 can subscribe to the streaming telemetry 602 data published by the agent 305 using "Telemetry Dial-In" or other such options for subscribing to the telemetry information from different sNICs. For example, where the upstream device 316 subscribes to the streaming telemetry 602 published by the agent 305 on the host 302, the upstream device 316 can be made aware of the load distribution and offload. For example, the upstream device 316 can determine the proportion of the load directed to each of the sNICs 312A-B being offloaded by the respective sNICs 312A-B based on the streaming telemetry 602. The upstream device 316 can then distribute the flow between the links 314A-B to the sNICs 312A-B based on the offload awareness.

Figure 7:
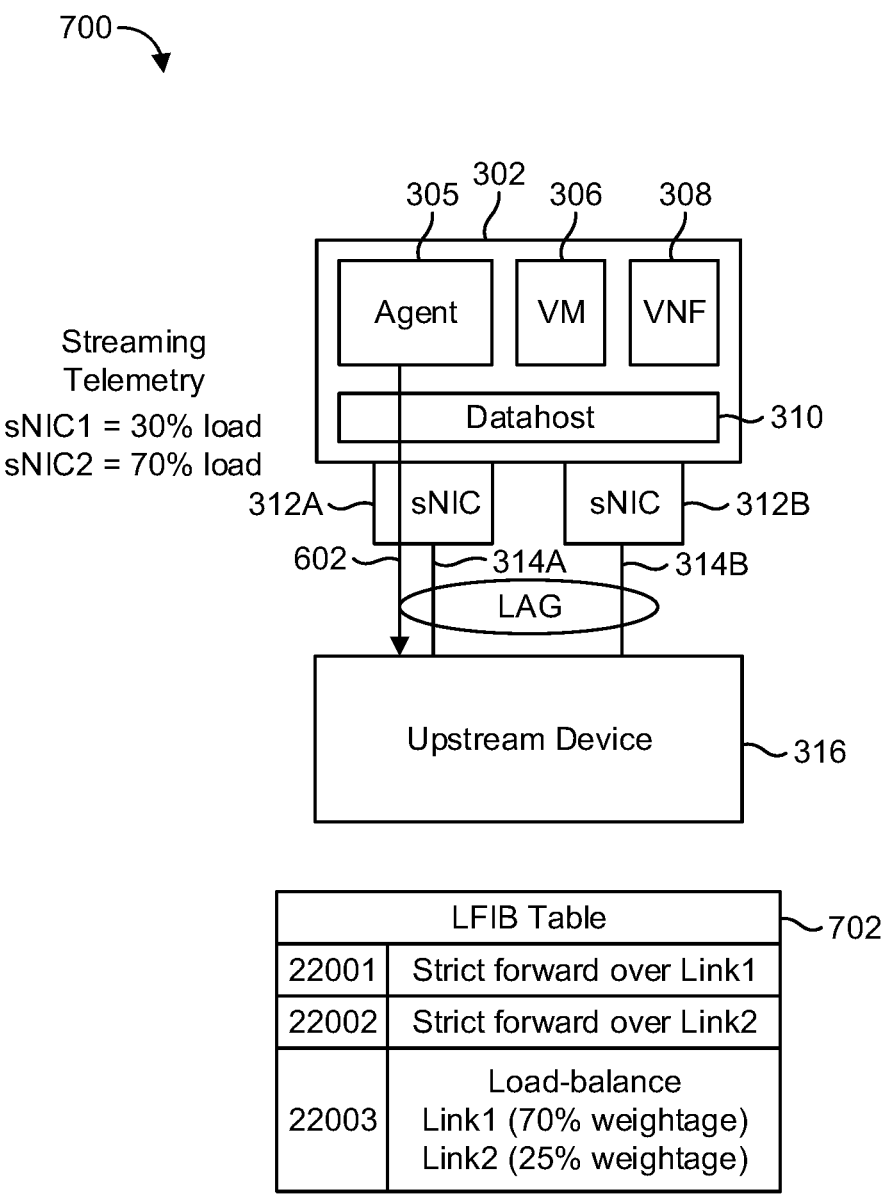
FIG. 7 illustrates aspects of using weights to convey load distribution policies in streaming telemetry information published by an agent, in accordance with some examples.

FIG. 7 aspects of the network 300 where weights can be associated with the SIDs for load sharing. For example, the weight 702 (e.g., 30% load) and the weight 704 (e.g., 70% load) can be indicated for the link 314A and the link 314B, respectively, in the streaming telemetry 602 published by the agent 305. The upstream device 316 can use the weights 702 and 704 to determine the traffic which has been offloaded by the sNICs 312A and 312B based on the traffic which was sent on the links 314A and 314B. Moreover, the weights 702 and 704 can be dynamically adjusted based on the load information received by the agent 305 and reflected in the telemetry data published as streaming telemetry 602. In the above illustrative example, since the sNIC 312A is less loaded in comparison to the sNIC 312B, the upstream device 316 can increase a proportion of load to be forwarded to the sNIC 312A as compared to the sNIC 312B.

The LFIB table 710 includes entries 720, 722, and 724 to illustrate weight based load distribution. For example, the entries 720 and 722 can be similar to the entries 520 and 522 of FIG. 5 for strictly forwarding traffic over the links 314A and 314B based on their respective offloads received from the streaming telemetry 602. In some examples, the load balancing based on the weights can include the entry 724 where 70% of the load is forwarded to the sNIC 312A which is loaded at 30% over the link 314A, while 30% of the load is forwarded to the sNIC 312B which is loaded at 70% over the link 314B to accomplish service offload aware load distribution.

In some examples, as shown with reference to FIGS. 2B-C above, multiple upstream devices can be connected to the same host over multiple sNICs. The one-hop mechanism for subscribing to telemetry data as in the case of the single upstream device can be modified when multiple upstream devices are connected in this manner. For example, where there are two or more upstream devices, the streaming telemetry can be used by a centralized analytics server to monitor the load and program the relevant upstream nodes to steer the traffic flows over respective sNICs for offloading.

Figure 8:
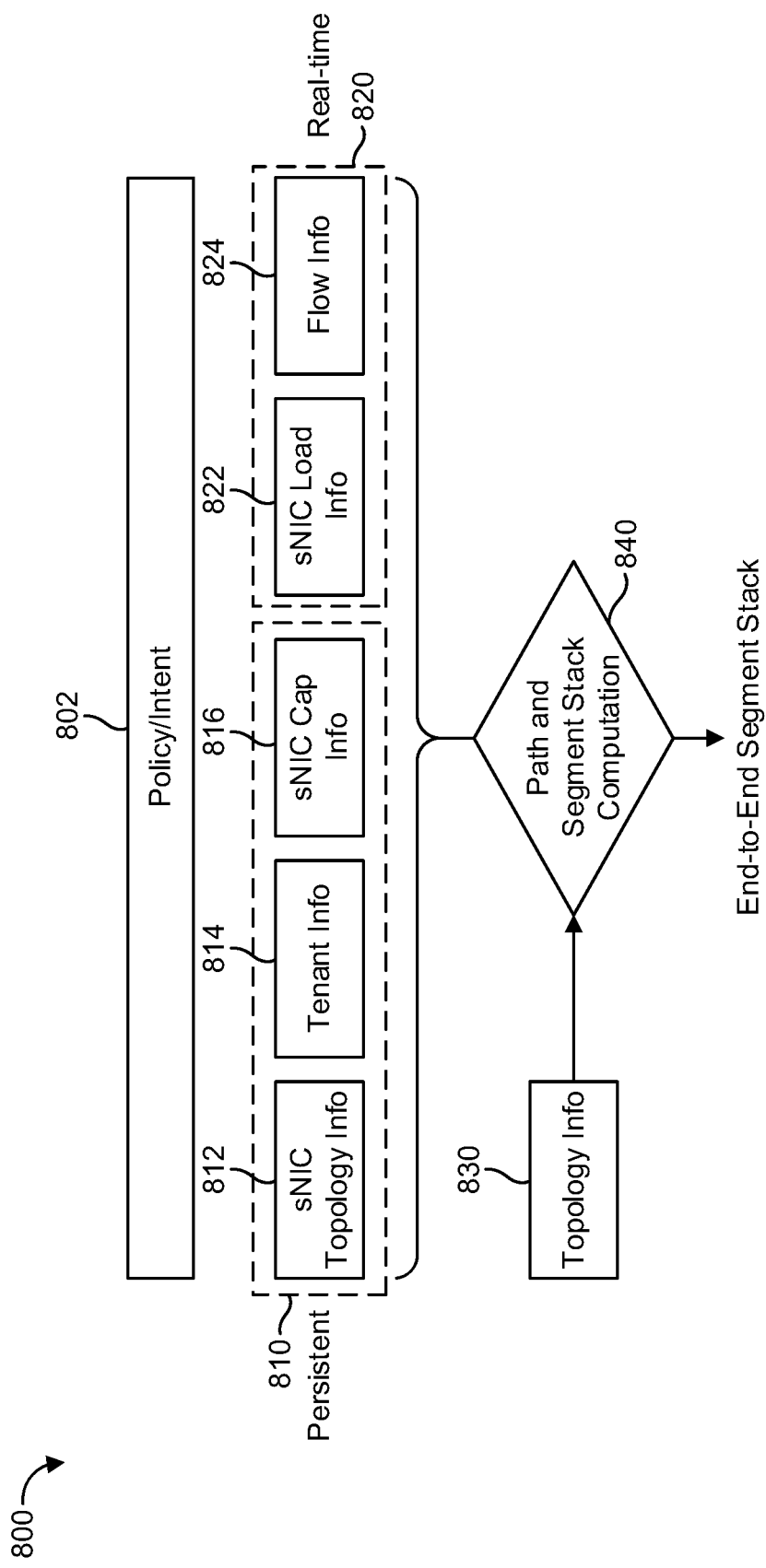
FIG. 8 illustrates aspects of a system for determining policy or intent based load distribution in a network comprising multiple upstream devices, in accordance with some examples.

FIG. 8 illustrates a system 800 for policy/intent based load distribution in the network 300, where multiple upstream devices may direct traffic to the host 302 over multiple sNICs. In the system 800, logic for load distribution can be implemented based on policy or intent. For example, a policy/intent block 802 can include functionality for obtaining fixed or persistent data 810 and variable real-time data 820 from the two or more upstream devices.

In some examples, the persistent data 810 can include information which may not vary with traffic. The persistent data can include sNIC topology 812, tenant information 814 (e.g., server infrastructure, number of clients, etc. in the host 302), sNIC capability information 816, and other information pertaining to the different sNICs 312A-B, for example. The dynamically variable real-time data 820 can include the sNIC load information 822, the traffic flow 824, etc. Both the persistent data 810 and the real-time data 820 can be obtained by the controller 330 or another centralized analytics server, e.g., based on being collected and published by the agent 305. The controller 330, for example, can use the persistent data 810 and the real-time data 820 to generate an end-to-end segment stack of the devices of the network 300 involved in the load distribution. For example, the controller 330 can use the topology information obtained from the network 318, the persistent data 810 and the real-time data 820 to perform a path and segment stack computation 840 which can reveal the network devices, upstream devices, links, sNICs (along with respective SIDs), the host, and other devices in the end-to-end segment stack.

Figure 9:
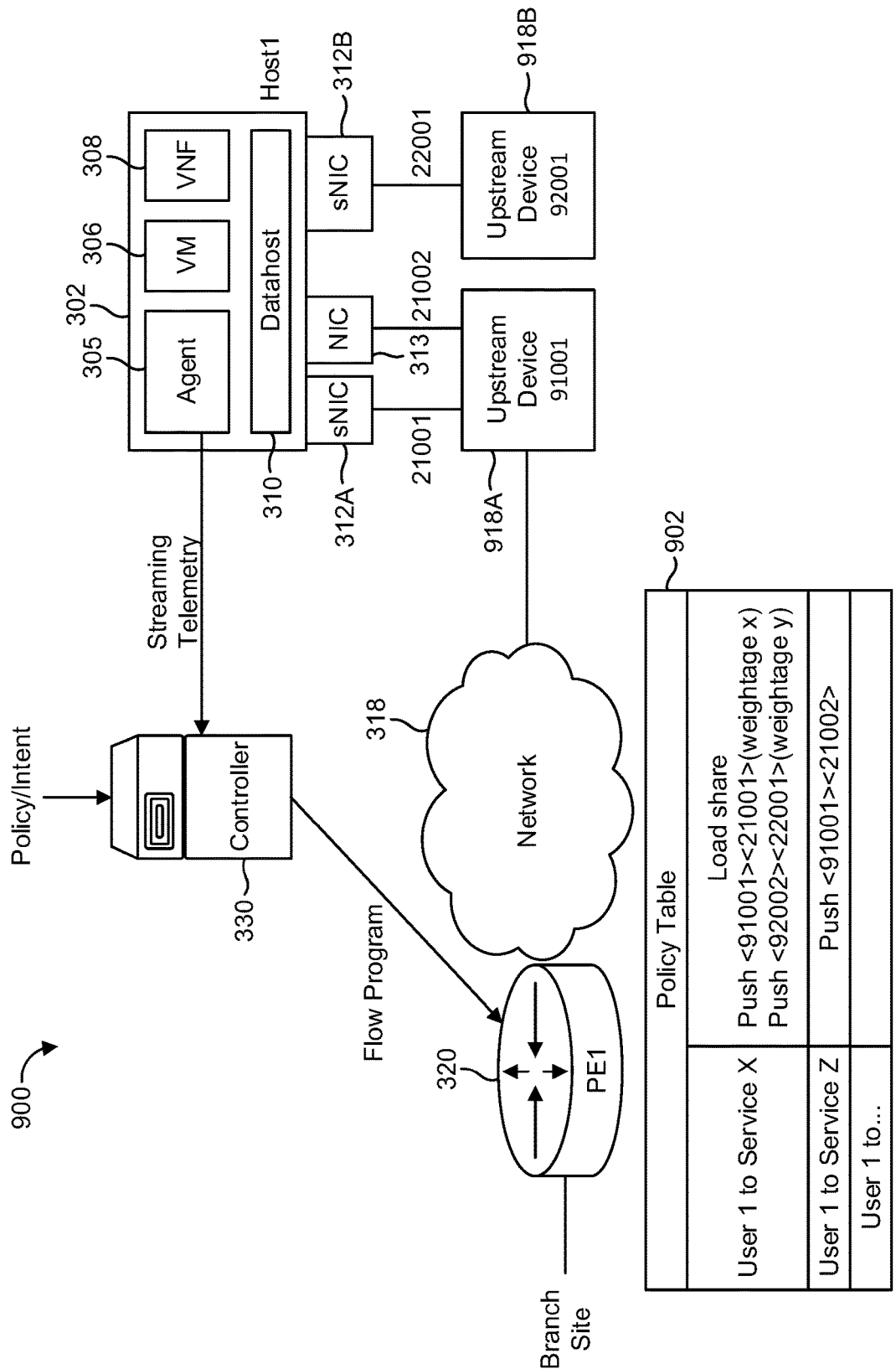
FIG. 9 illustrates an example of policy or intent based load distribution in a network comprising multiple devices, in accordance with some examples.

FIG. 9 shows an illustrative example of implementing the system 800 in the network 300. Two upstream devices 918A-B are shown as being connected to the host 302. A business intent determined in the policy/intent block 802 can include continuous delivery of a service X by the host 302 for users in a branch site 904 (e.g., for a particular tenant T1). The users may be connected to the host 302 to the network 318 through an edge device such as a provider edge router (PE1) 320. For service X this business intent may translate to a requirement for a high bandwidth and low latency path with service security and acceleration. In some examples, the controller 330 can obtain the business intent, receive the persistent data 810, network topology, etc., from the PE1 320, and the real-time data 820 from the streaming telemetry published by the agent 305. The controller 330 can determine that the network 318 includes at least the upstream devices 918A-B capable of directing traffic to the host 302 through different links connected to sNICs 312A-B and a traditional NIC 313.

The controller 330 can utilize the end-to-end visibility from the branch site 320 to the host 302 and based on the real-time data, identify the load distribution among the different NICs and sNICs. For example, the business intent can include specifications for performance and topology visibility at both transit underlay network, overlay network and the service offload capability for the sNICs. As shown in the entry 920 of the policy table 902, the load distribution for the service X can be implemented using a combination of traffic routed through the upstream device 918A and the sNIC 312A (with specific weight "x" identified using the SID for the sNIC 312A) and the upstream device 918B and the sNIC 312B (with specific weight "y" identified using the SID for the sNIC 312B). For another service Z, as shown in the entry 922, the user may not require the same specifications based on a different intent and for this service, the traffic can be directed over the NIC 313 without relying on service offloading capabilities.

Figure 10:
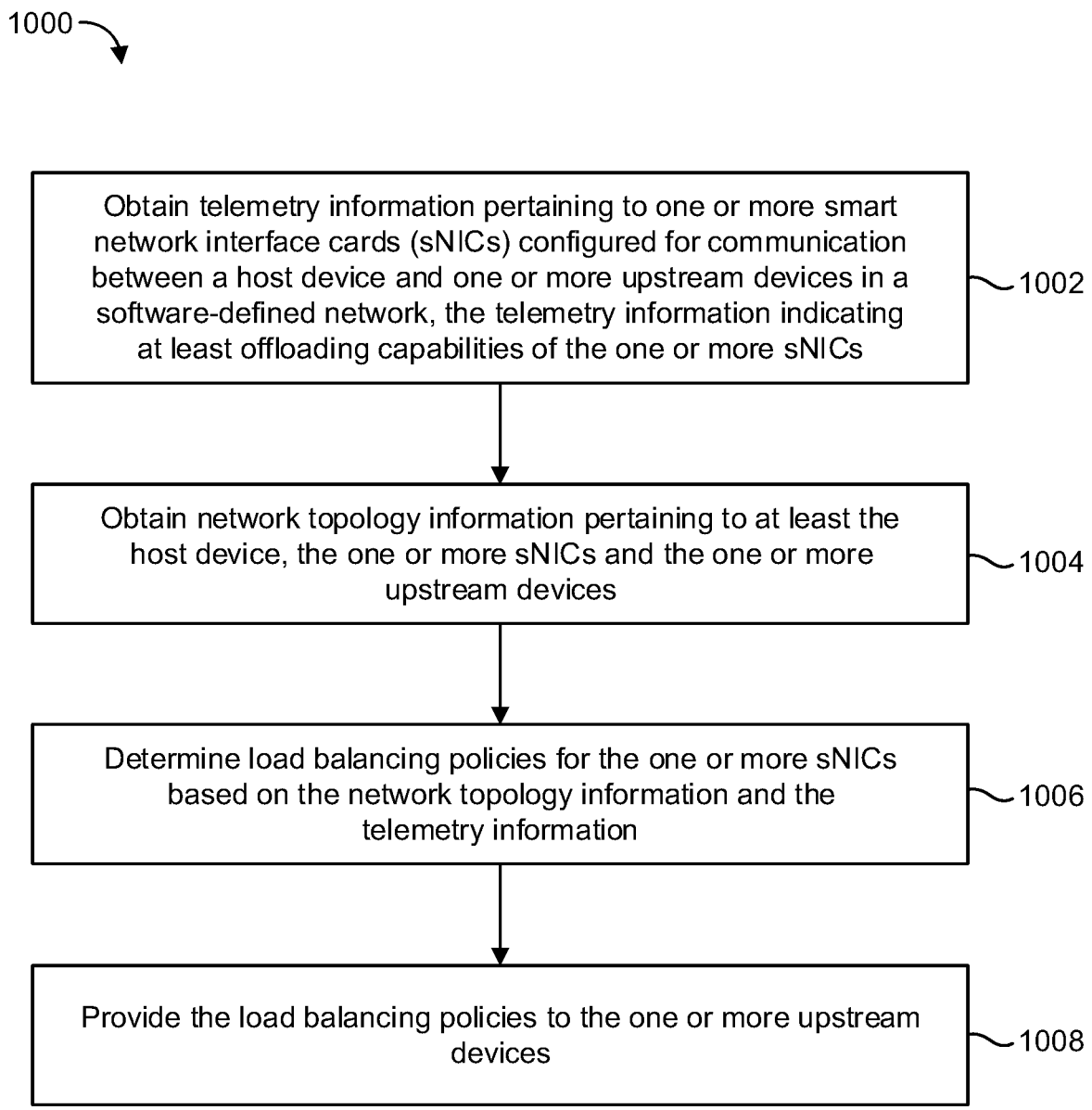
FIG. 10 illustrates a process for load distribution amongst sNICs taking into account their service offload capabilities, in accordance with some examples.

Having described example systems and concepts, the disclosure now turns to the process 1000 illustrated in FIG. 10. The blocks outlined herein are examples and can be implemented in any combination thereof, including combinations that exclude, add, or modify certain steps.

At the block 1002, the process 1000 includes obtaining telemetry information pertaining to one or more smart network interface cards (sNICs) configured for communication between a host device and one or more upstream devices in a software-defined network, the telemetry information indicating at least service offloading capabilities of the one or more sNICs. In some examples, obtaining the telemetry information can include instantiating an agent in the host device to gather the telemetry information and receiving the telemetry information based on the telemetry information being published by the agent. For example, the controller 330 can instantiate the agent 305 in the host 302 for obtaining telemetry information pertaining to the one or more sNICs 312A-B connected to the host 302. The sNICs 312A-B can be configured for communication between the host 302 and the upstream device 316 (or multiple upstream devices 918A-B) in a software-defined network 300. The telemetry information can indicate at least service offloading capabilities of the sNICs 312A-B.

At the block 1004, the process 1000 includes obtaining network topology information pertaining to at least the host device, the one or more sNICs and the one or more upstream devices. For example, the controller 330 can be an SDN controller for the network 300, and obtain network topology information pertaining to host 302, the sNICs 312A-B, the upstream devices 316, and any other network device in an end to end stack from a site 320 over a fabric such as the network 318.

At the block 1006, the process 1000 includes determining load distribution policies for the one or more sNICs based on the network topology information and the telemetry information. Some examples of the process 1000 can further include receiving one or more segment identifiers (SIDs) associated with the one or more sNICs and providing the load distribution policies to the one or more upstream devices using the one or more SIDs. For example, the controller 330 can receive the SIDs 402A-B associated with the sNICs 312A-B or their respective links 314A-B, and utilize the SIDs to identify the sNICs and determine a load distribution policy which takes into account the network topology and service offload capabilities of the sNICs 312A-B.

In some examples, the process 1000 can include determining load distribution policies for two or more sNICs connected to two or more upstream devices based on a combination of persistent data and real-time data, the persistent data comprising one or more of the network topology information, tenant information in the host, and service offloading capability information for the two or more sNICs, and the real-time data comprising traffic load of the two or more sNICs. For example, where multiple upstream devices 918A-B may communicate with the host 302 using multiple sNICs 312A-B, the controller 330 can utilize a system 800 for policy/intent block 802 to determine the load distribution policies using persistent data 810, real-time data 820, and topology information 830 as discussed with reference to FIG. 8.

At the block 1008, the process 1000 includes providing the load distribution policies to the one or more upstream devices. In some examples, the load distribution policies can include granular policies for forwarding traffic over one or more links connecting the one or more upstream devices to the one or more sNICs, the granular policies comprising indications of strict forwarding over the one or more links or load balancing over a combination of two or more of the one or more links. For example, as shown in the entries 520-524 of the LFIB table 510, granular policies can be provided for forwarding over links 314A-B or combinations thereof. In some examples, the load distribution policies to the one or more upstream devices can include an indication for forwarding traffic over a link to at least network interface card (NIC) not configured for service offloading. For example, as shown in the entry 526 of the LFIB table 512, the load distribution policy can include forwarding over link 315 to a traditional NIC 313.

Some examples, providing the load distribution policies to the one or more upstream devices comprises providing one or more weights associated with one or more links connecting the one or more upstream devices to the one or more sNICs, wherein load distribution over the one or more links is based on respective one or more weights associated with the one or more links. For example, the weights 702-704 can be included in the streaming telemetry 602 published by the agent 305, to be used by the upstream device 316 subscribing to the streaming telemetry 602 for load distribution over the links 314A-B based on the weights.

Figure 11:
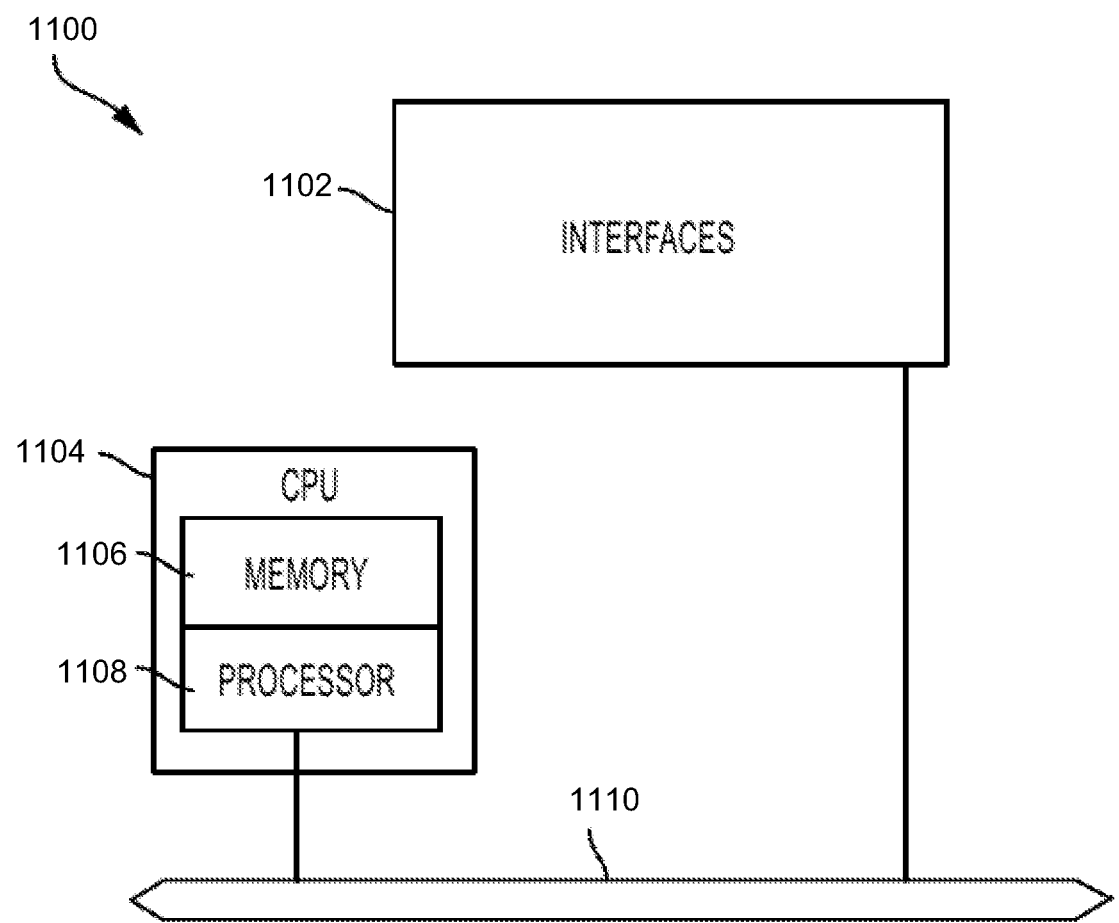
FIG. 11 illustrates an example network device in accordance with some examples.

FIG. 11 illustrates an example network device 1100 suitable for implementing the aspects according to this disclosure. In some examples, the controller 330, the upstream device 316 (or other), the host 302, the sNICs, NICs, remote devices, edge devices, or other devices described herein may be implemented according to the configuration of the network device 1100. The network device 1100 includes a central processing unit (CPU) 1104, interfaces 1102, and a connection 1110 (e.g., a PCI bus). When acting under the control of appropriate software or firmware, the CPU 1104 is responsible for executing packet management, error detection, and/or routing functions. The CPU 1104 preferably accomplishes all these functions under the control of software including an operating system and any appropriate applications software. The CPU 1104 may include one or more processors 1108, such as a processor from the INTEL X86 family of microprocessors. In some cases, processor 1108 can be specially designed hardware for controlling the operations of the network device 1100. In some cases, a memory 1106 (e.g., non-volatile RAM, ROM, etc.) also forms part of the CPU 1104. However, there are many different ways in which memory could be coupled to the system.

The interfaces 1102 are typically provided as modular interface cards (sometimes referred to as "line cards"). Generally, they control the sending and receiving of data packets over the network and sometimes support other peripherals used with the network device 1100. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the CPU 1104 to efficiently perform routing computations, network diagnostics, security functions, etc.

Although the system shown in FIG. 11 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 1100.

Regardless of the network device's configuration, it may employ one or more memories or memory modules (including memory 1106) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. The memory 1106 could also hold various software containers and virtualized execution environments and data.

The network device 1100 can also include an application-specific integrated circuit (ASIC), which can be configured to perform routing and/or switching operations. The ASIC can communicate with other components in the network device 1100 via the connection 1110, to exchange data and signals and coordinate various types of operations by the network device 1100, such as routing, switching, and/or data storage operations, for example.

Figure 12:
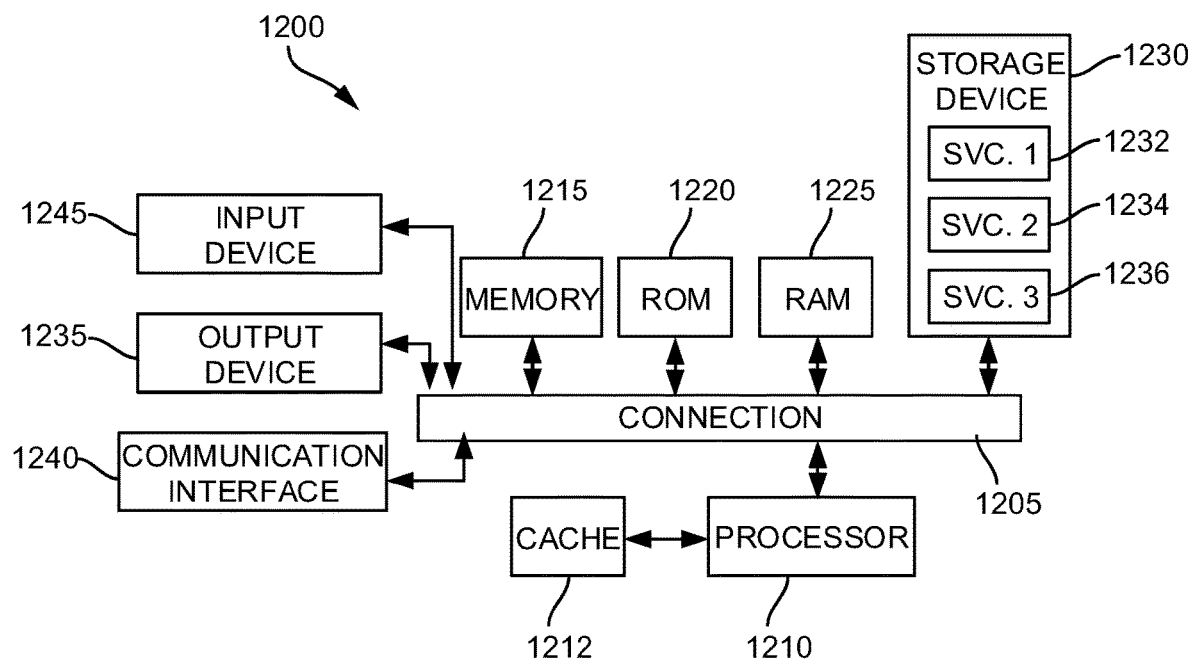
FIG. 12 illustrates an example computing device architecture, in accordance with some examples.

FIG. 12 illustrates an example computing device architecture 1200 of an example computing device which can implement the various techniques described herein. The components of the computing device architecture 1200 are shown in electrical communication with each other using a connection 1205, such as a bus. The example computing device architecture 1200 includes a processing unit (CPU or processor) 1210 and a computing device connection 1205 that couples various computing device components including the computing device memory 1215, such as read only memory (ROM) 1220 and random access memory (RAM) 1225, to the processor 1210.

The computing device architecture 1200 can include a cache of high-speed memory connected directly with, in close proximity to, or integrated as part of the processor 1210. The computing device architecture 1200 can copy data from the memory 1215 and/or the storage device 1230 to the cache 1212 for quick access by the processor 1210. In this way, the cache can provide a performance boost that avoids processor 1210 delays while waiting for data. These and other modules can control or be configured to control the processor 1210 to perform various actions. Other computing device memory 1215 may be available for use as well. The memory 1215 can include multiple different types of memory with different performance characteristics. The processor 1210 can include any general purpose processor and a hardware or software service, such as service 1 1232, service 2 1234, and service 3 1236 stored in storage device 1230, configured to control the processor 1210 as well as a special-purpose processor where software instructions are incorporated into the processor design. The processor 1210 may be a self-contained system, containing multiple cores or processors, a bus, memory controller, cache, etc. A multi-core processor may be symmetric or asymmetric.

To enable user interaction with the computing device architecture 1200, an input device 1245 can represent any number of input mechanisms, such as a microphone for speech, a touch-sensitive screen for gesture or graphical input, keyboard, mouse, motion input, speech and so forth. An output device 1235 can also be one or more of a number of output mechanisms known to those of skill in the art, such as a display, projector, television, speaker device, etc. In some instances, multimodal computing devices can enable a user to provide multiple types of input to communicate with the computing device architecture 1200. The communications interface 1240 can generally govern and manage the user input and computing device output. There is no restriction on operating on any particular hardware arrangement and therefore the basic features here may easily be substituted for improved hardware or firmware arrangements as they are developed.

Storage device 1230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1225, read only memory (ROM) 1220, and hybrids thereof. The storage device 1230 can include services 1232, 1234, 1236 for controlling the processor 1210. Other hardware or software modules are contemplated. The storage device 1230 can be connected to the computing device connection 1205. In one aspect, a hardware module that performs a particular function can include the software component stored in a computer-readable medium in connection with the necessary hardware components, such as the processor 1210, connection 1205, output device 1235, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
   obtaining telemetry information pertaining to one or more smart network interface cards (sNICs) configured for communication between a host device and one or more upstream devices in a software-defined network, the telemetry information indicating at least service offloading capabilities of the one or more sNICs;
   obtaining network topology information pertaining to at least the host device, the one or more sNICs and the one or more upstream devices;
   determining load distribution policies for the one or more sNICs based on the network topology information and the telemetry information; and
   providing the load distribution policies to the one or more upstream devices, wherein the load distribution policies to the one or more upstream devices further comprise an indication for forwarding traffic over a link to at least network interface card (NIC) not configured for service offloading.

2. The method of claim 1, wherein obtaining the telemetry information comprises instantiating an agent in the host device to gather the telemetry information and receiving the telemetry information based on the telemetry information being published by the agent.

3. The method of claim 1, further comprising:
   receiving one or more segment identifiers (SIDs) associated with the one or more sNICs and providing the load distribution policies to the one or more upstream devices using the one or more SIDs.

4. The method of claim 3, wherein the load distribution policies comprise granular policies for forwarding traffic over one or more links connecting the one or more upstream devices to the one or more sNICs, the granular policies comprising indications of strict forwarding over the one or more links or load balancing over a combination of two or more of the one or more links.

5. The method of claim 1, wherein providing the load distribution policies to the one or more upstream devices comprises providing one or more weights associated with one or more links connecting the one or more upstream devices to the one or more sNICs.

6. The method of claim 5, wherein load distribution over the one or more links is based on respective one or more weights associated with the one or more links.

7. The method of claim 1, further comprising:
determining load distribution policies for two or more sNICs connected to two or more upstream devices based on a combination of persistent data and real-time data, the persistent data comprising one or more of the network topology information, tenant information in the host device, and service offloading capability information for the two or more sNICs, and the real-time data comprising traffic load of the two or more sNICs.

8. A system, comprising:
one or more processors; and
a non-transitory computer-readable storage medium containing instructions which, when executed on the one or more processors, cause the one or more processors to perform operations including:
obtaining telemetry information pertaining to one or more smart network interface cards (sNICs) configured for communication between a host device and one or more upstream devices in a software-defined network, the telemetry information indicating at least service offloading capabilities of the one or more sNICs;
obtaining network topology information pertaining to at least the host device, the one or more sNICs and the one or more upstream devices;
determining load distribution policies for the one or more sNICs based on the network topology information and the telemetry information; and
providing the load distribution policies to the one or more upstream devices, wherein the load distribution policies to the one or more upstream devices further comprise an indication for forwarding traffic over a link to at least network interface card (NIC) not configured for service offloading.

9. The system of claim 8, wherein obtaining the telemetry information comprises instantiating an agent in the host device to gather the telemetry information and receiving the telemetry information based on the telemetry information being published by the agent.

10. The system of claim 8, wherein the operations further comprise:
receiving one or more segment identifiers (SIDs) associated with the one or more sNICs and providing the load distribution policies to the one or more upstream devices using the one or more SIDs.

11. The system of claim 10, wherein the load distribution policies comprise granular policies for forwarding traffic over one or more links connecting the one or more upstream devices to the one or more sNICs, the granular policies comprising indications of strict forwarding over the one or more links or load balancing over a combination of two or more of the one or more links.

12. The system of claim 8, wherein providing the load distribution policies to the one or more upstream devices comprises providing one or more weights associated with one or more links connecting the one or more upstream devices to the one or more sNICs.

13. The system of claim 12, wherein load distribution over the one or more links is based on respective one or more weights associated with the one or more links.

14. The system of claim 8, wherein the operations further comprise:
determining load distribution policies for two or more sNICs connected to two or more upstream devices based on a combination of persistent data and real-time data, the persistent data comprising one or more of the network topology information, tenant information in the host device, and service offloading capability information for the two or more sNICs, and the real-time data comprising traffic load of the two or more sNICs.

15. A non-transitory machine-readable storage medium, including instructions configured to cause a data processing apparatus to perform operations including:
obtaining telemetry information pertaining to one or more smart network interface cards (sNICs) configured for communication between a host device and one or more upstream devices in a software-defined network, the telemetry information indicating at least service offloading capabilities of the one or more sNICs;
obtaining network topology information pertaining to at least the host device, the one or more sNICs and the one or more upstream devices;
determining load distribution policies for the one or more sNICs based on the network topology information and the telemetry information; and
providing the load distribution policies to the one or more upstream devices, wherein the load distribution policies to the one or more upstream devices further comprise an indication for forwarding traffic over a link to at least network interface card (NIC) not configured for service offloading.

16. The non-transitory machine-readable storage medium of claim 15, wherein obtaining the telemetry information comprises instantiating an agent in the host device to gather the telemetry information and receiving the telemetry information based on the telemetry information being published by the agent.

17. The non-transitory machine-readable storage medium of claim 15, wherein the operations further comprise:
receiving one or more segment identifiers (SIDs) associated with the one or more sNICs and providing the load distribution policies to the one or more upstream devices using the one or more SIDs.

18. The non-transitory machine-readable storage medium of claim 17, wherein the load distribution policies comprise granular policies for forwarding traffic over one or more links connecting the one or more upstream devices to the one or more sNICs, the granular policies comprising indications of strict forwarding over the one or more links or load balancing over a combination of two or more of the one or more links.

19. The non-transitory machine-readable storage medium of claim 15, wherein providing the load distribution policies to the one or more upstream devices comprises providing one or more weights associated with one or more links connecting the one or more upstream devices to the one or more sNICs.

20. The non-transitory machine-readable storage medium of claim 19, wherein load distribution over the one or more links is based on respective one or more weights associated with the one or more links.

* * * * *